528-323 SR
9/30/86 X3 RE 32,256

United States Patent [19] [11] E Patent Number: Re. 32,256
Gagliani et al. [45] Reissued Date of Patent: Sep. 30, 1986

[54] MODIFIED POLYIMIDE FOAMS AND METHODS OF MAKING SAME

[76] Inventors: John Gagliani, 6280 Lance Pl., San Diego, Calif. 92120; John V. Long, 1756 E. Lexington Pl., El Cajon, Calif. 92021

[21] Appl. No.: 616,811

[22] Filed: Jun. 4, 1984

Related U.S. Patent Documents

Reissue of:
[64] Patent No.: 4,394,464
Issued: Jul. 19, 1983
Appl. No.: 565,574
Filed: Dec. 27, 1983

U.S. Applications:
[62] Division of Ser. No. 390,778, Jun. 21, 1982.

[51] Int. Cl. ..... C08J 9/22; C08J 9/24; C08J 9/32

[52] U.S. Cl. ..... 521/180; 521/183; 521/184; 521/185; 521/189; 528/184; 528/322; 528/323; 528/328

[58] Field of Search ..... 521/99, 122, 123, 180, 521/183, 184, 185; 528/184, 322, 323, 328

[56] References Cited

U.S. PATENT DOCUMENTS 4,335,120 10/1982 Gagliani et al. ..... 521/189
4,360,604 11/1982 Gagliani et al. ..... 521/189
4,361,453 11/1982 Gagliani et al. ..... 521/189

*Primary Examiner*—Morton Foelak
*Attorney, Agent, or Firm*—Frank D. Gilliam

[57] ABSTRACT

Methods of making modified polyimide/polyimide-amide foams and the resulting compositions. An N-substituted aliphatic imide is prepared by reacting a suitable aromatic dianhydride with a suitable oxoimine. A polyimide forming material is prepared by dissolving the N-substituted aliphatic imide in an esterifying solvent, then adding a suitable aromatic diamine. This material is dried to a powder or film. A foam is produced by heating the material to reaction temperature for a period sufficient to produce a stable foam. The material melts, then spontaneously expands into a foam which becomes self supporting and cures to a resilient flexible foam. Depending upon heating conditions, a polyimide, polyimide-amide or mixture thereof may be produced, resulting in foams having varying physical properties.

4 Claims, No Drawings

MODIFIED POLYIMIDE FOAMS AND METHODS OF MAKING SAME

Matter enclosed in heavy brackets [ ] appears in the original patent but forms no part of this reissue specification; matter printed in italics indicates the additions made by reissue.

*This is a division of reissue application Ser. No. 390,778, filed June 21, 1982.*

BACKGROUND OF THE INVENTION

This invention relates in general to polyimide resins and, more specifically, to compositions and methods for making resilient, flame resistant modified polyimide and polyimide-amide foams.

Prior U.S. Pat. Nos. 4,161,477, 4,183,838 and 4,183,839 disclosed and claimed certain polyimide compositions which are flame resistant and useful as coatings and adhesives.

The coating and adhesive compositions described in the above-mentioned prior patents are made by first preparing a suitable bisimide by reacting an aromatic tetracarboxylic acid dianhydride with a cyclic amide or oxoimine. The ratio of oxoimine to dianhydride is preferably in the 2.3:1 to 2.7:1 range and the imidization reaction is preferably conducted at a temperature of 170°-200° C. for 20-60 minutes.

The polyimide forming material is then prepared by dissolving the bisimide in an inert solvent; then adding thereto a suitable diamine, producing a viscous fluid containing an intimate, unpolymerized mixture of N-substituted cyclic bisimide dicarboxylic acid and diamine which is capable of being converted to a high molecular weight polymer by the application of heat.

The solution is coated onto a surface and polymerized by heating to a temperature in the 177°-316° C. range for 30 minutes to 5 hours. The following is exemplary of the exchange reaction which occurs:

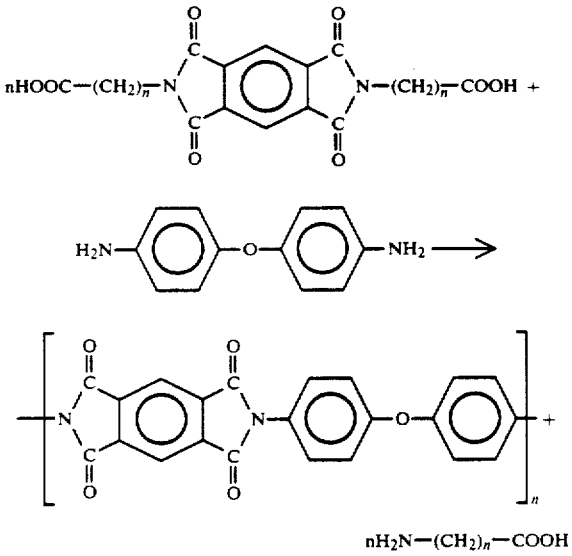

where n is a positive integer.

The resulting coating is tough, highly adherent to various surfaces, with very few pinholes or bubbles. It has excellent peel strength and is resistant to high temperatures, peeling and abrasion.

The prior coating material, however, was not suitable for use in applications requiring a cellular or foam material, since conventional agitation foaming and addition of known blowing agents add to process costs and complexity and are not entirely effective at the relatively high polymerization temperature required.

SUMMARY OF THE INVENTION

We have now found that, by suitably varying reaction conditions and certain ingredients, within specified limits, materials similar to those described above and in the cited prior patents can be used to produce a resilient, flame resistant, modified polyimide cellular structure. For the purposes of this application, "modified polymide" will be used to mean a mixture of polyimide and polyimide-amide resins varying from almost entirely polyimide to almost entirely polyimide-amide.

The basic steps in producing our improved resilient foam are reacting a suitable aromatic dianhydride with a suitable oxoimine in a ratio to dianhydride between about 1.5:1 and 0.05:1 to produce a monoimide (excessive quantities of bisimide are produced above 1.5:1, which are not suitable for the foaming reaction), dissolving this mixture in a reactive solvent which is an esterifying agent, to esterify the imide, adding a suitable diamine and any desired additives, drying the solution to a film or powder and finally heating the dry material to a temperature sufficient to cause the dry material to melt and spontaneously foam. The heating causes the dry material to simultaneously undergo a condensation reaction and an exchange reaction. The condensation reaction produces water and alcohol vapors which cause the molten mass to expand. As the reactions proceed, the molten mass forms a cellular structure which becomes self-supporting and finally cures to an imide and/or an imide-amide polymer depending on heating conditions.

DETAILED DESCRIPTION OF THE INVENTION

Any suitable aromatic dianhydride may be used in the preparation of the desired imides. Typical aromatic dianhydrides include those described and referenced in the patents listed above. Due to their ready availability at reasonable prices and the excellent foams which result, pyromellitic dianhydride and 3,3', 4,4' benzophenone tetracarboxylic acid dianhydride (BTDA) are preferred.

Any suitable oxoimine may be reacted with the selected dianhydride to produce the desired imide. Preferably, the oxoimine has the general formula:

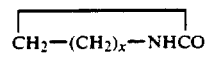

where "x" is a positive integer from 2 to 4. Of these, best results are obtained with caprolactam because larger ring structures tend to open with heat and react with the aromatic dianhydride.

While any suitable reaction conditions may be used, we have obtained the best results where the dianhydride is added to the oxoimine and the mixture is heated to about 150°-200° C. until imidization is complete, about 5-90 minutes. Optimum results have been obtained at about 180° C. for about 30 minutes.

In order to produce a superior foaming material, we have found that it is essential that the mole ratio of oxoimine to dianhydride be in the range of about 1.5:1 to 0.05:1. Above this range, the material forms a coating without foaming, while below this range excessively rigid material is produced. Within this range optimum results occur with a mole ratio of oxoimine to dianhydride of about 1.0 to 1.0.

The imides produced by the above reaction have the general formula:

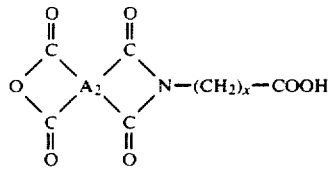

wherein "x" is an integer from 2 to 4 and "$A_2$" is selected from the group consisting of:

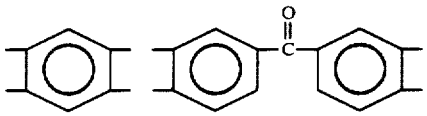

and mixtures thereof.

The imide thus produced is then esterified by dissolving it in a suitable reactive solvent at a suitable temperature. Any suitable reactive solvent which acts as an esterifying agent may be used. Typical of these are aliphatic alcohols having up to 7 carbon atoms and aromatic alcohols, which may have halogen or amino substitutions, and mixtures thereof. Best results have been obtained with methyl alcohol. The esterification reaction takes place as follows:

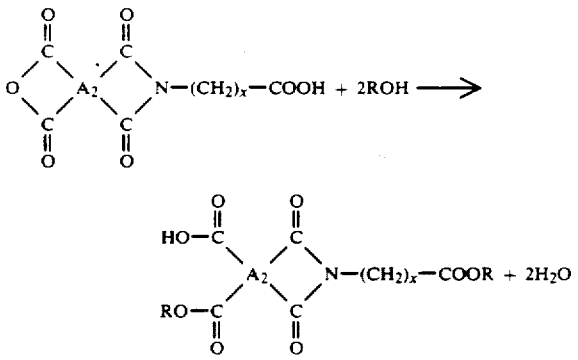

wherein "x" is an integer from 2 to 4, "$A_2$" is as listed for the imide above and "R" is an aliphatic or aromatic radical which may have halogen or amino substitutions. This esterification may take place under any suitable conditions. Typically, a mole ratio of imide to esterifying agent of from about 1:8 to 1:15 is preferred to assure rapid esterification at reflux temperature. This solution is heated to reflux (about 70°-80° C.) until clear, which takes about 60-90 minutes.

Once the esterification is complete, the selected diamine or diamines are added to the solution. Preferably, an approximately stoichiometric quantity of diamine is used.

Any suitable diamine may be used. Typically diamines include meta-phenylene diamine, para-phenylene diamine; 4,4'-diaminodiphenyl ether, 4,4'-diaminodiphenyl sulfone, 3,3'-diaminodiphenyl sulfone, 4,4'-diaminodiphenyl sulfide, 4,4'-diaminodiphenyl methane, 3,3' diaminodiphenyl methane and mixtures thereof. Of these, best results are obtained with 4,4'-diaminodiphenyl methane which is, therefore, preferred. If desired, aliphatic diamines may be used in combination with these aromatic diamines. Typical aliphatic diamines include 1,3 diamino propane, 1,4 diamino butane, 1,6-diamino hexane, 1,8-diamino octane, 1,12 diamino dodecane and mixtures thereof.

Additives to improve various characteristics of the final foam may be added as desired. Any appropriate additives may be used, such as fillers, surfactants to improve uniformity of the cellular structure, ultraviolet absorbers or the like. Typical surfactants include Dow Corning Corp. 190 or 193, (a silicone surfactant), FC430 from Minnesota Mining & Manufacturing Co., Zonyl FSC from E. I. dePont de Nemours & Co., and L550 from Union Carbide Corp. While any suitable concentration may be used, from about 0.01 to 2% (by weight, based on the weight of the solution prior to drying) is preferred. Of these surfactants, best results have been obtained with Zonyl FSC. Fillers and reinforcing additives may be added prior to drying the resin. Typical fillers include Kevlar aramid fibers, graphite fibers, glass fibers, carbon and graphite fibers. Teflon fluorocarbon powders and mixtures thereof.

The solution is then dried by any suitable method. Simply heating the solution in an oven to a temperature of about 65°-95° C. until dry is satisfactory. Other conventional methods, such as spray drying, rotary drying, thin film evaporation, etc. may be used as desired. The resulting free-flowing powder or flakes may be further ground or treated as desired and may be stored indefinitely at room temperature.

The final step is converting the powder into a foam is accomplished by heating the powder to the selected foaming temperature for a suitable period.

The reaction which takes place is quite complex, since it is a combined condensation and exchange reaction. When the exchange reaction is forced to completion by higher temperatures and/or prolonged heating, in the range of 230°-315° C. for 30-60 minutes (optimally, about 260° C. for about 45 minutes) the polyimide structure is primarily formed as shown by the following general reaction:

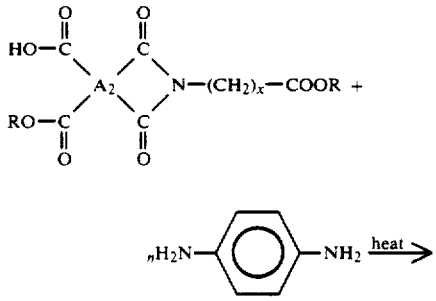

-continued

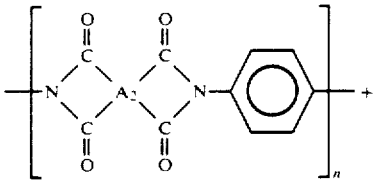

$$nH_2N-(CH_2)_x-COOH + H_2O + ROH$$

where "x" is an integer from 2 to 4 and $A_2$ is as listed for the imide above.

If, however, the exchange reaction is stopped prior to completion the products of the intermediate condensation reaction will still be present, so that a variable (depending on reaction time, temperature and conditions) amount of a polymer having the following imide-amide structure will remain:

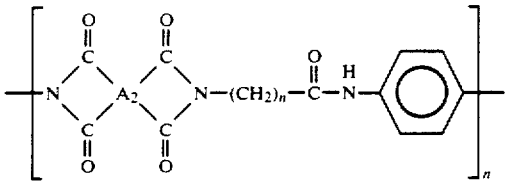

where "x" is an integer from 2 to 4 and $A_2$ is a radical as listed for the imide above.

As the powder is heated it first melts and, as the condensation reaction begins water and alcohol are released and vaporized, causing the molten mass to expand. The resulting cellular structure becomes self-supporting and finally cures to an imide and imide-amide polymer, with proportions of the two polymers depending on heating (time and temperature) conditions. The resulting foam is tough, resilient and will not emit significant smoke or toxic by-products when exposed to open flame.

Where substantially entirely imide-amide foam is desired, heating should be at from about 120° C. to about 220° C. for about 10 to 40 minutes, with optimum results at about 200° C. for about 30 minutes. As temperature is increased above this range (and the somewhat longer heating period is used) the proportion of polyimide will increase. The foam is more flame resistant, but less flexible, with the higher proportion of polymide. Thus, by varying heating conditons flexibility and flame resistance can be tailored to meet specific requirements.

Details of the invention will be further understood upon reference to the following examples, which describe preferred embodiments of the methods and compositions of this invention. All parts and percentages are by weight, unless otherwise indicated.

EXAMPLE I

About 120.8 g. (0.375 M) of 3,3',4,4'-benzophenonetetracarboxylic acid dianhydride (BTDA) and about 28.29 g. (0.25 M) caprolactam are placed in a one liter flask and heated to about 175° C. After about 30 minutes at this temperature the mixture is cooled to about 50° C. and about 100 g. of ethanol is added. This mixture is heated to reflux temperature (about 75° C.). Reflux is continued until the mixture appears clear, about 70 minutes. The mixture is cooled to just below about 70° C. and about 75 g. (0.375 M) 4,4'-diaminodiphenyl methane is added. This mixture is refluxed (at about 75° C.) for about 15 minutes, then is cooled to room temperature and coated onto aluminum foil. The coating has a heavy, syrup-like consistency, with a thickness of about 20–40 mils. The coating is dried for about 3 hours at about 65° C. The dry residue is removed from the foil and placed in an oven preheated to about 260° C. After about 45 minutes of heating, the material is found to have expanded into a flexible, resilient foam sheet having a homogenous cellular structure. When exposed to an open flame, the foam produces no visible smoke. This foam is found to consist primarily of polyimide.

EXAMPLE II

The procedure of Example I is repeated four additional times, varying only the quantity of caprolactam used. Where Example I used about 28.29 g. (0.25 M) of caprolactam to give a molar ratio of caprolactam of BDTA of about 0.66:1, the four additional experiments use caprolactam quantities of about: II(a) 43.4 g (0.375 M, 1:1 ratio), II(b) 53 g. (0.468 M, 1.25:1 ratio), II(c) 63.6 g. (0.5625 M, 1.5:1 ratio) and II(d) 84.8 g (0.75 M, 2:1 ratio). The foam produced in experiments II(a) and II(b) have excellent foam rise characteristics, while that produced in II(c) has low foam rise and II(d) does not foam. This demonstrates that ratios of oxoimine to dianhydride in the 0.05:1 to 1.5:1 ratios are necessary for the production of good quality foam.

EXAMPLE III

The procedures of Example I are repeated, except that in place of ethanol, the following solvents are used: III(a) isopropyl alcohol, III(b) aminoethyl alcohol, III(c) benzene, III(d) dimethyl acetamide and III(e) acetone. In each case [III(a) and III(b)] where a reactive solvent is used to esterify the imide, an excellent foam results. Where an inert solvent is used, in III(c) through III(e), foaming does not take place.

EXAMPLE IV

The procedures of Example I are followed with five samples, but only up to the heating to foam step. The five dry powder samples are placed in preheated circulating air ovens at the following temperatures for the following time periods: IV(a) about 125° C. for about 40 minutes, IV(b) about 200° C. for about 30 minutes, IV(c) about 220° C. for about 10 minutes, IV(d) about 235° C. for about 30 minutes, and IV(e) about 310° C. for about 30 minutes. Each sample forms a foam of good resiliency and flame resistance. Samples IV(a) and IV(b) are found to be primarily imide-amide and to have outstanding flexibility but lower flame resistance. Example IV(c) is found to be a relatively even mix of imide and amide-imide and to have intermediate flexibility and flame resistance. Examples IV(d) andd IV(e) are found to be primarily polyimide and to have less flexibility but outstanding flame resistance. In general, higher temperatures and longer heating periods produce a greater polyimide proportion and a stiffer foam. The higher temperatures are found to be more significant than the longer heating periods in producing the high polyimide foams.

EXAMPLE V

The procedures of Example I are repeated, except that the following diamines are used in place of the 4,4'-diaminodiphenyl methane: V(a) m-phenylene diamine (0.375 M), V(b) 4,4'-diaminodiphenyl sulfone (0.375 M), V(c) 4,4'-diaminodiphenyl oxide (0.375 M), V(d) 4,4'-diaminodiphenyl oxide (0.1875 M) and 4,4'-diaminodiphenyl sulfide (0.1875 M). In each case the resulting foam has a uniform cellular structure and has excellent heat and flame resistance. The flexibility and resiliency varies somewhat among the sub-examples.

EXAMPLE VI

The procedures of Example I are repeated with the only change being the substitution of the following oxoimines for the 0.25 M caprolactam specified in Example I: VI(a) 2-pyrrolidone (0.25 M), VI(b) 2-piperidone (0.25 M), VI(c) caprolactam (0.125 M) and 2-piperidone (0.125 M). The product in each case is an excellent, flame resistant foam, with slight changes in physical properties with the different oxoimines.

EXAMPLE VII

About 322 g. (1 M) 3,3',4,4'-benzophenone tetracarboxylic acid dianhydride and about 226 g. (2 M) caprolactam are added to a 5 liter flask and heated at about 170° C. for about 30 minutes. The mixture is cooled to about 70° C., then about 800 g. of methanol is added. After the esterification reaction product is fully dissolved, an additional about 644 g. (2 M) of 3,3'4,4'-benzophenonetetracarboxylic acid dianhydride is added. The material is refluxed until clear and then is cooled to about 45° C. About 297 g. (1.5 M) 4,4'-diaminodiphenyl methane and about 192 g. (0.96 M) 4,4'-diaminodiphenyl oxide are added and stirred at about 50° C. until dissolved. About 64 g. (0.54 M) 1,6-diamine hexane is dissolved in about 100 g. of methanol and added to the mixture while maintaining the mixture at a temperature below about 55° C. The mixture is then heated to about 65° C. and held there for about 10 minutes. About 17 g. of Dow Corning 193, a silicone surfactant, is added to the mixture, which is stirred while cooling to room temperature. The resulting liquid mixture is dried using a high speed atomizer spraying into a chamber preheated to about 75° C. The dried resin is collected and stored at room temperature. A layer of the powder is placed in a thermal oven (pre-heated to about 200° C.) for about 60 minutes. The powder is observed to first melt, then expand into a very flexible and resilient foam sheet with very uniform cell structure and having a compression set value at about 90% compression of less than about 20%. This demonstrates the usefulness of aliphatic diamines with the aromatic diamines.

EXAMPLE VIII

The procedures of Example VII are repeated, except that the heating step is accomplished using a microwave oven. The powder is placed in the oven and a power of about 1.0 KW is applied for about 6 minutes. Rapid melting and expansion result, producing an excellent resilient foam after about 6 minutes.

Although specific components, proportions and conditions have been specified in the above examples, these may be varied with similar results, where suitable. In addition, other materials may be added to the foamable material, such as fillers, colorants, ultraviolet absorbers, or the like.

Other applications, modifications and ramifications of the present invention will occur to those skilled in the art upon reading the present disclosure. These are intended to be included within the scope of the invention, as defined in the appended claims.

I claim:

[1. The method of making a resilient, flame resistant modified polyimide foam which comprises the steps of:

reacting an aromatic dianhydride with an oximine having the general formula:

$$\overline{CH_2-(CH_2)_x-NHCO}$$

wherein "X" is an integer from 2 to 4, in a mole ratio of oxoimine to dianhydride between about 1.5:1 and about 0.05:1 to produce an N-substituted aliphatic amide;

dissolving said imide in a reactive solvent esterifying agent to exterify said imide;

adding thereto a diamine;

drying the solution; and heating the dry material to a selected foaming temperature of from about 120° C. to about 320° C. for a period of from about 10 to about 60 minutes;

whereby a resilient foam having good flame resistance is produced comprising polyimide and polyimide-amide with proportions depending on the selected foaming temperature.]

[2. The method according to claim 1 wherein said foaming temperature is in the range of from about 230° C. and about 320° C. and the resulting foam comprises primarily a polyimide.]

[3. The method according to claim 1 wherein said foaming temperature is in the range of from about 120° C. and about 220° C. and the resulting foam is primarily a polyimide-amide.]

[4. The method according to claim 1 wherein said aromatic dianhydride is pyromellitic dianhydride, 3,3',4,4'-benzophenone tetracarboxylic acid dianhydride or mixtures thereof.]

[5. The method according to claim 1 wherein said oxoimine is caprolactam.]

[6. The method according to claim 1 wherein said reactive solvent is methyl alcohol.]

[7. The method according to claim 1 wherein said diamine is 4,4'-diaminophenyl methane.]

[8. The method according to claim 1 wherein said diamine comprises at least two different diamines, at least one of which is an aromatic diamine.]

[9. The method according to claim 1 further including the step of adding from about 0.01 to about 2 wt. % of a surfactant to the solution prior to drying.]

[10. The method according to claim 1 further including the step of adding fillers or reinforcing materials to the solution prior to drying.]

[11. The method of making a modified polyimide foam comprising a mixture of polyimide and polyimide-amide resins with the polyimide-amide predominating which comprises the steps of:

mixing together an aromatic dianhydride selected from pyromellitic dianhydride, 3,3',4,4'-benzophenone tetracarboxylic acid dianhydride and mixtures thereof and an oxoimine having the general formula:

$$CH_2-(CH_2)_x-NHCO$$

wherein "x" is an integer from 2 to 4, the mole ratio of oxoimine to dianhydride being from about 1.5:1 to about 0.05:1;

heating the mixture to a temperature of from about 150° C. to about 200° C. for from about 5 to about 90 minutes to react said dianhydride with said oxoimine to produce an N-substituted aliphatic imide;

cooling the mixture to a temperature of from about 40° C. to about 70° C.;

dissolving said imide in a reactive solvent esterifying agent to esterify said imide;

heating the imide solution to reflux at a temperature of from about 70° C. to about 80° C. for a period of from about 60 to about 90 minutes to esterify said imide;

adding thereto about 1.0 M 4,4'-diaminodiphenyl methane per 1.0 M of dianhydride;

heating the resulting solution to reflux at a temperature of from about 70° C. to about 80° C. for a period of about 2 to about 30 minutes;

drying the solution at a temperature of from about 60° C. to about 70° C. for a period of about 60 to about 240 minutes to produce a dry material; and foaming said dry material by heating to a temperature of about 120° C. to about 220° C. in a pre-heated oven for from about 10 to about 40 minutes;

whereby a resilient, flame resistant modified polyimide foam is produced consisting primarily of polyimide-amide resin.]

[12. The method of making a modified polyimide foam comprising a mixture of polyimide and polyimide-amide with the polyimide predominating which comprises the steps of:

mixing together an aromatic dianhydride selected from pyromellitic dianhydride, 3,3',4,4'-benzophenone tetracarboxylic acid dianhydride and mixtures thereof and an oxoimine having the general formula:

$$CH_2-(CH_2)_x-NHCO$$

where "x" is an integer from 2 to 4, the mole ratio of oxoimine to dianhydride being from about 1.5:1 to about 0.05:1;

heating the mixture to a temperature of from about 150° C. to about 200° C. for from about 5 to about 90 minutes to react with dianhydride with said oxoimine to produce an N-substituted aliphatic imide;

cooling the mixture to a temperature of from about 40° C. to about 70° C.;

dissolving said imide in a reacting solvent esterifying agent to esterify said imide;

heating the imide solution to reflux at a temperature of from about 70° C. to about 80° C. for a period of from about 60 to about 90 minutes to esterify said imide;

adding thereto about 1.0 M 4,4'-diaminodiphenyl methane per about 1.0 M of dianhydride;

heating the resulting solution to reflux at a temperature of from about 70° C. to about 80° C. for a period of about 2 to about 30 minutes;

drying the solution at a temperature of from about 60° C. to about 70° C. for a period of about 60 to about 240 minutes to produce a dry material; and foaming said dry material by heating to a temperature of about 230° C. to about 320° C. in a pre-heated oven for about 30 to about 60 minutes;

whereby a resilient flame resistant modified polyimide foam is produced consisting primarily of polyimide resin.]

[13. The method of making a modified polyimide foam comprising a mixture of polyimide and polyimide-amide with significant portions of both polyimide and polyimide-amide which comprises the steps of:

mixing together an aromatic dianhydride selected from pyromellitic dianhydride, 3,3',4,4'-benzophenone tetracarboxylic acid dianhydride and mixtures thereof and an oxoimine having the general formula:

$$CH_2-(CH_2)_x-NHCO$$

wherein "x" is an integer from 2 to 4, the mole ratio of oxoimine to dianhydride being from about 1.5:1 to about 0.05:1;

heating the mixture to a temperature of from about 150° C. to about 200° C. for from about 5 to about 90 minutes to react said dianhydride with said oxoimine to produce an N-substituted aliphatic imide;

cooling the mixture to a temperature of from about 40° C. to about 70° C.;

dissolving said imide in a reactive solvent esterifying agent to esterify said imide;

heating the imide solution to reflux at a temperature of from about 70° C. to about 80° C. for a period of from about 60 to about 90 minutes to esterify said imide;

adding thereto about 1.0 M 4,4'-diaminodiphenyl methane per about 1.0 M of dianhydride;

heating the resulting solution to reflux at a temperature of from about 70° C. to about 80° C. for a period of about 2 to about 30 minutes;

drying the solution at a temperature of from about 60° C. to about 70° C. for a period of about 60 to about 240 minutes to produce a dry material; and foaming said dry material by heating to a temperature of from about 210° C. to about 250° C. for a period of about 30 to about 45 minutes;

whereby a resilient flame resistant modified polyimide foam is produced containing significant portions of both polyimide and polyimide-amide resins.]

*14. A foamable product produced by the following process steps:*

*reacting an aromatic dianhydride with an oxoimine having the general formula:*

$$CH_2-(CH_2)_x-NHCO$$

*wherein "x" is an integer from 2 to 4, in a mole ratio of oxoimine to dianhydride between about 1.5:1 and about 0.05:1 to produce an N-substituted aliphatic imide;*

*dissolving said imide in a reactive solvent esterifying agent to esterify said imide; and*

*drying the resulting solution,*

*whereby the dried solution when heated to a temperature of from about 120° C. to about 320° C. for a period of from about 10 to about 60 minutes, forms a resilient foam having good flame resistance.*

*15. A foamable product produced by the following process steps:*

*reacting an aromatic dianhydride with an oxoimine having the general formula:*

$$\overline{CH_2-(CH_2)_x-NHCO}$$

*wherein "x" is an integer from 2 to 4, in a mole ratio of oxoimine to dianhydride between about 1.5:1 and about 0.05:1 to produce an N-substituted aliphatic imide;*

*dissolving said imide in a reactive solvent esterifying agent to esterify said imide; and*

*adding fillers or reinforcing materials to the solution prior to drying;*

*drying the resulting solution,*

*whereby the dried solution when heated to a temperature of from about 120° C. to about 320° C. for a period of from about 10 to about 60 minutes, forms a resilient foam having good flame resistance.*

*16. A foamable product produced from the following process steps:*

*mixing together an aromatic dianhydride selected from pyromellitic dianhydride, 3,3',4,4'-benzophenone tetracarboxylic acid dianhydride and mixtures thereof and an oxomine having the general formula:*

$$\overline{CH_2-(CH_2)_x-NHCO}$$

*wherein "x" is an integer from 2 to 4, the mole ratio oxoimine to dianhydride being from about 1.5:1 to about 0.05:1;*

*heating the mixture to a temperature of from about 150° C. to about 200° C. for about 5 to 90 minutes to react said dianhydride with said oxoimine to produce an N-substituted aliphatic imide;*

*cooling the mixture to a temperature of from about 40° C. to about 70° C.;*

*dissolving said imide in a reactive solvent esterifying agent to esterify said imide;*

*heating the imide solution to reflux at a temperature of from about 70° C. to about 80° C. for a period of from about 60 to about 90 minutes to esterify said imide;*

*adding thereto about 1.0 M 4,4'-diaminodiphenyl methane per 1.0 M of dianhydride;*

*heating the resulting solution to reflux at a temperature of from about 70° C. to about 80° C. for a period of about 2 to about 30 minutes; and*

*drying the solution at a temperature of from about 60° C. to about 70° C. for a period of about 60 to about 240 minutes to produce a dry material, whereby the dry material when heated to a temperature of about 230° C. to about 320° C. for about 30 to 60 minutes produces a resilient flame resistant, modified polyimide foam consisting primarily of polymide resin.*

*17. A foamable product produced from the following process steps:*

*mixing together an aromatic dianhydride selected from pyromellitic dianhydride 3,3',4,4'-benzophenone tetracarboxylic acid dianhydride and mixtures thereof and an oxoimine having the general formula:*

$$\overline{CH_2-(CH_2)_x-NHCO}$$

*wherein "x" is an integer from 2 to 4, the mole ratio of oxoimine to dianhydride being from about 1.5:1 to about 0.05:1;*

*heating the mixture to a temperature of from about 150° C. to about 200° C. for from about 5 to about 90 minutes to react said dianhydride with said oxoimine to produce an N-substituted aliphatic imide;*

*cooling the mixture to a temperature of from about 40° C. to about 70° C.;*

*dissolving said imide in a reactive solvent esterifying agent to esterify said imide;*

*heating the inside solution to reflux at a temperature of from about 70° C. to about 80° C. for a period of from about 60 to about 90 minutes to esterify said imide;*

*adding thereto about 1.0 M 4,4'-diaminodiphenyl methane per about 1.0 M of dianhydride;*

*heating the resulting solution to reflux at a temperature of from about 70° C. to about 80° C. for a period of about 2 to about 30 minutes; and*

*drying the solution at a temperature of from about 60° C. to about 70° C. for a period of about 60 to about 240 minutes to produce a dry material,*

*whereby the dry material when heated to a temperature of from about 210° C. to about 250° C. for a period of about 30 to 45 minutes produces a resilient flame resistant modified polyimide foam containing significant portions of both polyimide and polyimide-amide resins.*

* * * * *

UNITED STATES PATENT AND TRADEMARK OFFICE

CERTIFICATE OF CORRECTION

PATENT NO. : RE 32,256

DATED : September 30, 1986

INVENTOR(S) : John Gagliani, et al

It is certified that error appears in the above-identified patent and that said Letters Patent is hereby corrected as shown below:

On the face of the above reissued patent item [64], third line reads "Appl. No.: 565,574" and should read -- Appl. No.: 390,778 --

On the face of the above reissued patent item [64], fourth line reads "Filed: Dec. 27, 1983" and should read -- Filed: June 21, 1982 --

On the face of the above reissued patent item [62] reads "Division of Ser. No. 390,778, Jun. 21, 1982." and should read -- Division of Ser. No. 565,574, Dec. 27, 1983. --

Signed and Sealed this

Eleventh Day of July, 1989

*Attest:*

*Attesting Officer*

DONALD J. QUIGG

*Commissioner of Patents and Trademarks*